United States Patent [19]
Ohtsuka

[11] Patent Number: 5,655,168
[45] Date of Patent: Aug. 5, 1997

[54] CAMERA USING FILM CARTRIDGE CAPABLE OF SETTING FILM USAGE CONDITION

[75] Inventor: Masanori Ohtsuka, Kanagawa-ken, Japan

[73] Assignee: Canon Kabushiki Kaisha, Tokyo, Japan

[21] Appl. No.: 652,116

[22] Filed: May 23, 1996

[30] Foreign Application Priority Data

Jun. 1, 1995 [JP] Japan .................................. 7-156696

[51] Int. Cl.$^6$ .............................. G03B 1/00; H04N 1/036
[52] U.S. Cl. ........................................ 396/390; 348/96
[58] Field of Search ............................... 396/390; 348/96

[56] References Cited

U.S. PATENT DOCUMENTS

| | | | |
|---|---|---|---|
| 4,974,096 | 11/1990 | Wash | 348/96 X |
| 4,980,709 | 12/1990 | Cocca | 396/390 |
| 5,479,226 | 12/1995 | Kazami et al. | 396/390 |

Primary Examiner—W. B. Perkey
Attorney, Agent, or Firm—Robin, Blecker, Daley & Driscoll

[57] ABSTRACT

A camera of the kind using a film cartridge capable of setting various film usage conditions permits normal photographing actions when the camera is loaded with the film cartridge in an unused condition and inhibits photographing actions when the camera is loaded with the film cartridge in a completely used condition. The operating modes of the camera include a test mode in which photographing actions can be carried out for tests at a factory by loading the camera with the film cartridge in any of the film usage conditions.

23 Claims, 10 Drawing Sheets

CAMERA USING FILM CARTRIDGE CAPABLE OF SETTING FILM USAGE CONDITION

BACKGROUND OF THE INVENTION

1. Field of the Invention

This invention relates to an improvement on a film cartridge using device for use of a film cartridge capable of setting at least two of various film usage conditions including an unexposed condition, a partly exposed condition, an exposed condition and a developed condition, or on a camera or an image viewing apparatus equipped with the film cartridge using device.

2. Description of the Related Art

A device for handling a film cartridge capable of setting various usage conditions of the film has been disclosed in Japanese Laid-Open Patent Application No. HEI 5-72676. The film usage conditions settable in that device include "an unexposed condition" in which none of frame portions of the film has been used for photographing as yet, "an exposed condition" in which all frame portions of the film have been used for photographing, "a partly exposed condition" in which the film has been used for photographing only up to some intermediate frame portion, and "a developed condition" in which the film has already been subjected to a picture developing process. The film cartridge of this kind is very convenient because it enables the users of the film to visually discriminate the film usage conditions.

Further, in the case of a camera, for example, the camera can be configured so that only a film cartridge which is in the unexposed condition or in the partly exposed condition is allowed to be loaded (or to be transported in blank or to be used for photographing), and any film cartridge which is in the exposed condition or in the developed condition is prevented from being loaded (or from being transported in blank or being used for photographing even if the film cartridge is allowed to be loaded). Therefore, the camera for use of the film cartridge of this kind is advantageous in respect of operability as it effectively solves the problem of inadvertently making a double exposure or failing to take any actual shot even for a single frame by mistaking a film cartridge in the developed condition for a film cartridge in the unexposed condition.

As one of apparatuses adapted for use of the film cartridge of the above-stated kind, there has been developed an image viewing apparatus for receiving a film cartridge in the developed condition, pulling out the developed film from the film cartridge, reading out images from the film and displaying an image of each frame on a dedicated monitor or on a TV screen or the like for viewing or appreciation. The apparatus of this kind must be configured so as to be loadable with (or to be capable of processing images recorded in) only a film cartridge which is in the developed condition and to be inhibited from using any film cartridge which is in the unexposed condition, the partly exposed condition or the exposed condition (or to be inhibited from doing an image processing action on the film of such a film cartridge). The use of a film cartridge capable of setting various film usage conditions facilitates making a discrimination between film cartridges in the various film usage conditions. The discrimination enables the apparatus to prevent a double exposure if the film cartridge loaded happens to be in the unexposed condition or in the partly exposed condition and, if not, to be capable of smoothly carrying out an image processing action.

In the mean time, in the case of a camera or the like arranged to use the film cartridge capable of setting various film usage conditions as mentioned above, the camera must be subjected, prior to shipment from a factory, to adjustment work and various performance confirming tests, such as tests of film-transporting and shutter-operating actions by actually loading the camera with the film cartridge. In this instance, a film cartridge in the unexposed condition must be used for this purpose, because the camera is usually arranged to be loadable only with a film cartridge in the unexposed condition so as to prevent a double exposure.

Therefore, after the camera is subjected to the various tests with the film cartridge of the unexposed condition loaded on the camera, the film is rewound into the film cartridge and the film cartridge is taken out from the camera. At this time, the film usage condition of the film cartridge is set to the exposed condition. After that, the film usage condition of the film cartridge must be set back to the original unexposed condition by means of a dedicated jig, because one and the same film cartridge is usually used in common for many manufactured units of the camera. This work not only takes time but also necessitates the use of the dedicated jig.

Further, there has been developed a camera arranged to permit not only use of a film cartridge in the unexposed condition but also use of a film cartridge in the partly exposed condition (by detecting an unexposed frame position so as to take shots from this frame position). In the case of the camera of that kind, after tests of shooting, etc., are performed up to an intermediate point of the film, the film is rewound before the film cartridge is taken out. The film cartridge thus taken out can be loaded on another unit of the camera. However, after the film cartridge is used for these (partly exposing) tests on a certain number of units of the camera, the film cartridge is subjected to a photographing (spurious photographing or shooting) test covering all frames available. Hence, the film cartridge is to be eventually set in the exposed condition. After completion of tests on one unit, the film usage condition of the film cartridge must be set to the unexposed condition by using the dedicated jig. Therefore the camera of that kind also has had the same problem.

Further, in the case of the above-stated image viewing apparatus, the apparatus also must be subjected to adjustment work and various performance confirming tests, such as a film transporting action, image display action, etc., prior to shipment from the factory. In this case, a film cartridge in the developed condition must be used, because the apparatus is arranged to inhibit use of film cartridges in the unexposed condition, the partly exposed condition and the exposed condition for the purpose of preventing a double exposure or the like. Therefore, in using one and the same film cartridge in common for a certain number of manufactured units of the apparatus, the film usage condition of the film cartridge must be set back to the developed condition after completion of the tests of one unit for the tests of another unit. This setting work not only takes time but also necessitates an increase of investment in facilities for the dedicated jig.

SUMMARY OF THE INVENTION

This invention is directed to the solution of the above-stated problems.

In accordance with one aspect of the invention, there is provided a film cartridge using device arranged to be capable of using any film cartridge irrespective of its film usage condition in a predetermined mode and to permit tests of varied kinds without necessitating preparation of a great number of film cartridges in a specific film usage condition and without necessitating setting the film usage condition back to the specific film usage condition by means of a dedicated tool, or a camera or an image viewing apparatus which is equipped with the film cartridge using device.

In accordance with one aspect of the invention, there is provided a film cartridge using device arranged to be capable of making a check for capability of reliably setting a desired film usage condition by a setting means, or a camera or an image viewing apparatus which is equipped with the film cartridge using device.

In accordance with one aspect of the invention, for solving the above-stated problems, there is provided a film cartridge using device for using a film cartridge having a usage condition setting part arranged to be set to a state of indicating a usage condition of a film, comprising a usage condition detecting circuit for detecting a setting condition of the usage condition setting part, a processing circuit having a first mode of (i) performing a predetermined first processing action when the setting condition detected by the usage condition detecting circuit is a predetermined first usage condition and (ii) performing a second processing action different from the first processing action when the setting condition detected by the usage condition detecting circuit is a second usage condition different from the first usage condition and a second mode of performing the first processing action even when the setting condition of the usage condition setting part is the second usage condition, and a selection circuit for selecting one of the first and second modes.

In accordance with one aspect of the invention, for solving the above-stated problems, there is provided a film cartridge using device for using a film cartridge having a usage condition setting part arranged to be set to a state of indicating a usage condition of a film, comprising a usage condition detecting circuit for detecting a setting condition of the usage condition setting part, a processing circuit having a first mode of (i) performing a predetermined first processing action when the setting condition detected by the usage condition detecting circuit is a predetermined first usage condition and (ii) performing a second processing action different from the first processing action when the setting condition detected by the usage condition detecting circuit is a second usage condition different from the first usage condition and a second mode of inhibiting the second processing action even when the setting condition of the usage condition setting part is the second usage condition, and a selection circuit for selecting one of the first and second modes.

In accordance with one aspect of the invention, for solving the above-stated problems, there is provided a film cartridge using device, or a camera, for using a film cartridge having a usage condition setting part arranged to be set to a state of indicating a usage condition of a film, comprising a usage condition detecting circuit for detecting a setting condition of the usage condition setting part, a processing circuit having a first mode of (i) allowing at least a part of a sequence of photographing actions to be performed and setting the usage condition setting part to a state of indicating a usage condition of the film corresponding to a status of performing the sequence of photographing actions when the setting condition detected by the usage condition detecting circuit is a predetermined first usage condition and (ii) inhibiting the part of the sequence of photographing actions from being performed when the setting condition detected by the usage condition detecting circuit is a second usage condition different from the first usage condition and a second mode of performing the sequence of photographing actions and setting the usage condition setting part to a state of indicating the first usage condition, and a selection circuit for selecting one of the first and second modes.

In accordance with one aspect of the invention, for solving the above-stated problems, there is provided a film cartridge using device, or a camera, for using a film cartridge having a usage condition setting part arranged to be set to a state of indicating a usage condition of a film, comprising a usage condition detecting circuit for detecting a setting condition of the usage condition setting part, a processing circuit having a first mode of (i) allowing at least a part of a sequence of photographing actions to be performed and setting the usage condition setting part to a state of indicating a usage condition of the film corresponding to a status of performing the sequence of photographing actions when the setting condition detected by the usage condition detecting circuit is a predetermined first usage condition and (ii) inhibiting the part of the sequence of photographing actions from being performed when the setting condition detected by the usage condition detecting circuit is a second usage condition different from the first usage condition and a second mode of performing the sequence of photographing actions and retaining the setting condition of the usage condition setting part, and a selection circuit for selecting one of the first and second modes.

In accordance with one aspect of the invention, for solving the above-stated problems, there is provided a film cartridge using device, or a camera, for using a film cartridge having a usage condition setting part arranged to be set to a state of indicating a usage condition of a film, comprising a loading restricting part for allowing the film cartridge to be loaded on the film cartridge using device or the camera when the setting condition of the usage condition setting part is a first usage condition and for inhibiting the film cartridge from being loaded when the setting condition is a second usage condition, and a control circuit for inhibiting a loading inhibiting action of the loading restricting part.

In accordance with one aspect of the invention, for solving the above-stated problems, there is provided a film cartridge using device, or a camera, for using a film cartridge having a usage condition setting part arranged to be set to a state of indicating a usage condition of a film, comprising a usage condition detecting circuit for detecting a setting condition of the usage condition setting part, a data setting circuit for setting data indicative of a usage condition of the film, a processing circuit having a first mode of allowing at least a part of a sequence of photographing actions to be performed and setting the usage condition setting part to a state of indicating a usage condition of the film corresponding to a status of performing the sequence of photographing actions when the setting condition detected by the usage condition detecting circuit is a predetermined first usage condition and a second mode of setting the usage condition setting part to the usage condition according to the data set by the data setting circuit, and a selection circuit for selecting one of the first and second modes.

The above and other aspects and features of the invention will become apparent from the following detailed description of embodiments thereof taken in connection with the accompanying drawings:

DETAILED DESCRIPTION OF THE PREFERRED EMBODIMENTS

The invention is described in detail through its preferred embodiments below with reference to drawings.

First Embodiment

Figure 1:
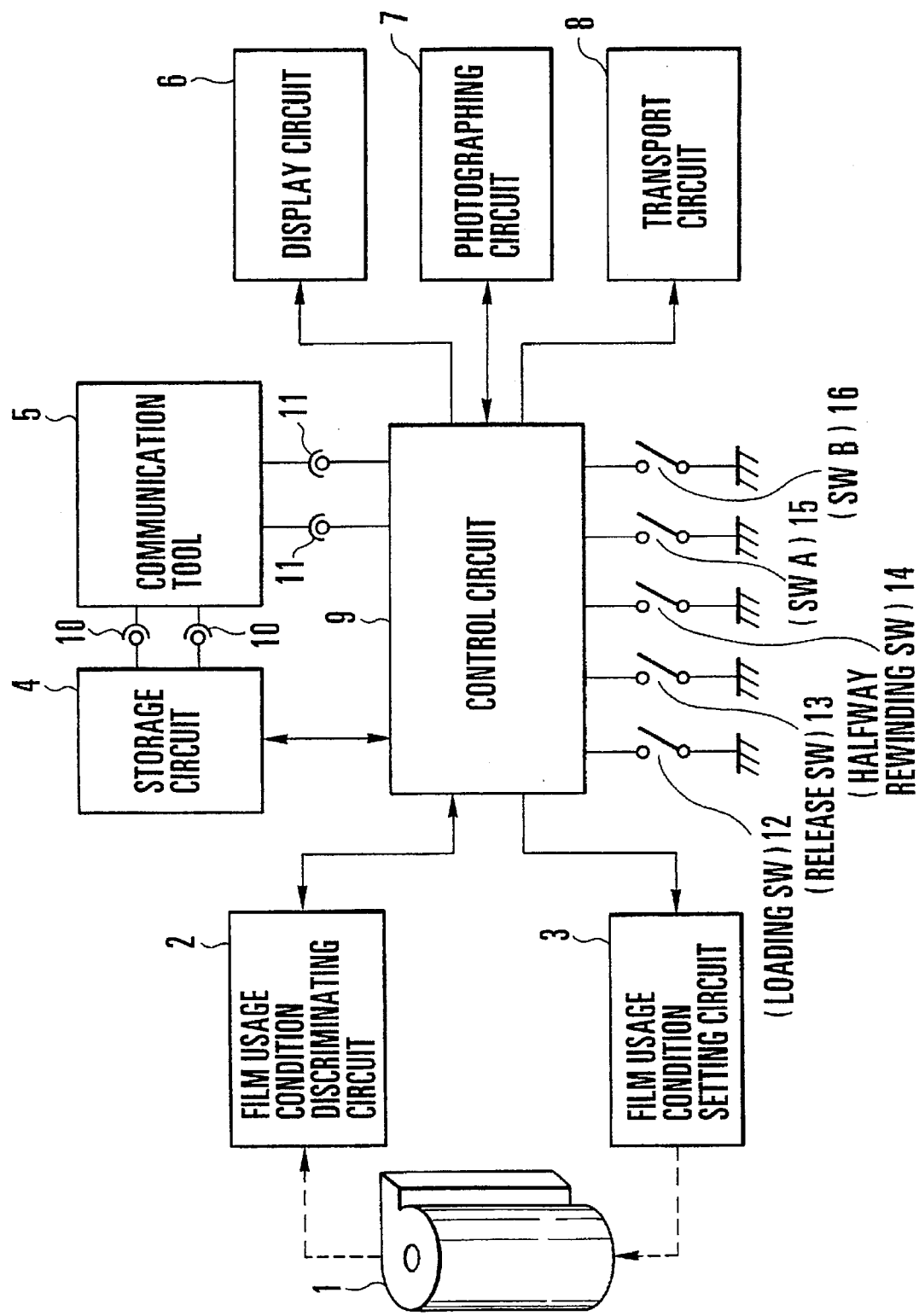
FIG. 1 is a block diagram showing the arrangement of essential parts of a camera which is arranged according to the invention as a first embodiment thereof.

FIG. 1 shows in a block diagram the arrangement of essential parts of a camera arranged, according to the invention as a first embodiment, to use a film cartridge capable of setting various film usage conditions.

Referring to FIG. 1, a film cartridge capable of setting various film usage conditions (at least two of an unexposed condition, an exposed condition, a partly exposed condition and a developed condition) is denoted by reference numeral 1. A film usage condition discriminating circuit 2 is arranged to discriminate each film usage condition of the film cartridge 1 from others. A film usage condition setting circuit 3 is arranged to set the film usage condition of the film cartridge 1. A storage circuit 4 is a nonvolatile memory such as an EEPROM or the like and arranged to store data of adjustment of varied kinds and data of a test mode. A communication tool 5 is arranged to be used in setting modes of varied kinds by setting information on the kind of mode of conducting a test or writing adjustment data into the storage circuit 4 through contacts 10 or by sending, through communication contacts 11, information on the details of a test to be conducted to a control circuit 9.

A display circuit 6 is arranged to display the loaded state of the film cartridge 1, a test mode or some other mode of the camera. A photographing circuit 7 is arranged to perform a sequence of photographing actions. A transport circuit 8 is arranged to transport the film in blank, to wind one frame portion of the film and to rewind the film. The control circuit 9 controls the above-stated parts, from the film usage condition discriminating circuit 2 through the transport circuit 8.

A cartridge loading switch 12 is arranged to be turned on when the camera is loaded with the film cartridge 1. A release switch 13 is provided for causing a photographing operation to begin. A halfway rewinding switch 14 is provided for rewinding the film halfway before the film reaches its end part. Switches 15 and 16 are switches A and B which are normally used for setting information of varied kinds. However, a test mode can be set by operating the switches 15 and 16 (switches A and B) in combination with each other or in combination with some other operation switch. All the parts shown in FIG. 1 except the communication tool 5 and the film cartridge 1 are disposed in the camera.

The actions of the essential parts of the camera arranged as described above are next described below with reference to FIG. 2 which is a flow chart. In the case of the first embodiment of the invention, the camera is arranged to normally permit the camera operator to use a film cartridge only when the film cartridge is either in the unexposed condition or in the partly exposed condition. More specifically, it is assumed that, while the camera can be loaded with a film cartridge in any of different film usage conditions, actions of the camera to be performed after transporting the film in blank are performed only when the film cartridge loaded is in the unexposed condition or in the partly exposed condition.

Figure 2:
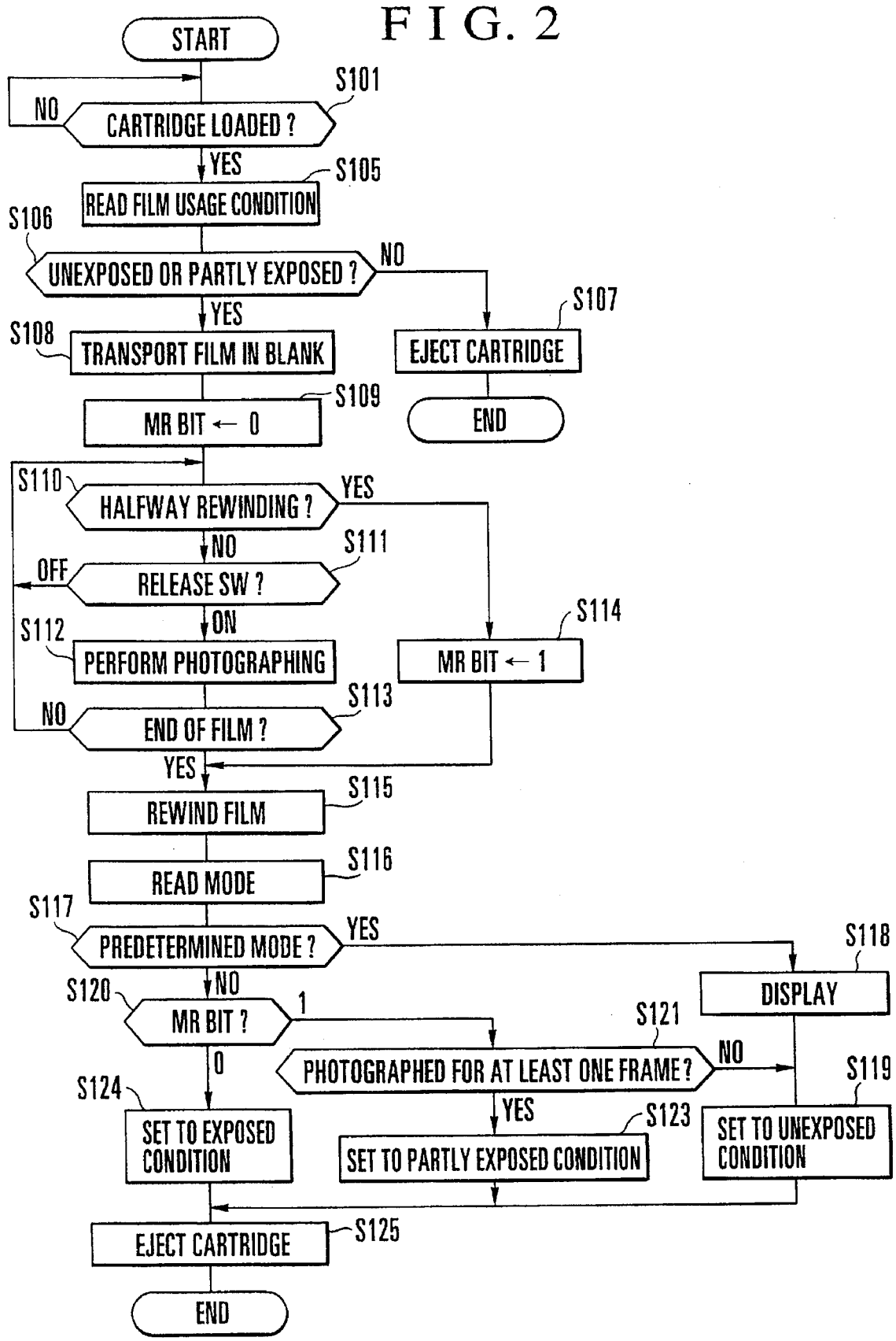
FIG. 2 is a flow chart showing an operation of the camera of the first embodiment of the invention.

Referring to FIG. 2, at a step S101, a check is made for the state of the cartridge loading switch 12. If the cartridge loading switch 12 is found to have been turned on, the camera is assumed to have been loaded with the film cartridge i capable of setting the various film usage conditions. Then, the flow of operation proceeds to a step S105. At the step S105, the control circuit 9 instructs the film usage condition discriminating circuit 2 to read the film usage condition of the film cartridge 1. At a step S106, a check is made to find if the film usage condition of the film cartridge 1 is either the unexposed condition or the partly exposed condition. If not, the flow comes to a step S107 to eject the film cartridge 1 and the flow of a series of actions comes to an end.

If the film usage condition of the film cartridge 1 is found to be either the unexposed condition or the partly exposed condition at the step S106, the flow comes to a step S108. At the step S108, the film is transported in blank. The blank film transporting action is performed to transport the film in blank to the position of its first frame portion when the film cartridge 1 is in the unexposed condition and to transport an exposed part of the film until the film comes to the position of an unexposed frame when the film cartridge 1 is in the partly exposed condition. The blank film transporting action is carried out by the transport circuit 8 under the control of the control circuit 9.

At a step S109, an MR bit which is a bit showing whether or not the film has been rewound halfway is cleared to "0". At a step S110, a check is made to find if the halfway rewinding switch 14 is pushed. If not, the flow comes to a step S111 to make a check for a pushed state of the release switch 13.

If the release switch 13 is found at the step S111 to have been pushed without pushing the halfway rewinding switch 14, the flow comes to a step S112. At the step S112, the photographing circuit 7 performs a sequence of photographing actions, and after that, one frame portion of the film is wound. At a step S113, a check is made to find if the film has come to its end part. If not, the flow comes back to repeat the steps S110 and S111 to find if the halfway rewinding switch 14 and the release switch 13 are pushed. These actions are repeated every time the release switch 13 is pushed again. After that, when the film is judged at the step S113 to have reached its end part, the flow comes to a step S115. At the step S115, the transport circuit 8 is caused to perform a film rewinding action.

Further, if the halfway rewinding switch 14 is found to have been pushed at the step S110, the flow comes to a step S114. At the step S114, the MR bit which shows whether or not the film is rewound halfway is set at "1". The flow then comes to the step S115 to cause the transport circuit 8 to rewind the film.

At a step S116, mode data stored in the storage circuit 4 is read out. At a step S117, a check is made to find if the read-out data indicates a predetermined mode (test mode) which, for example, requires a transporting test or the like by loading the camera actually with the film. If so, the flow comes to a step S118. At the step S118, the display circuit 6 is caused to provide a display indicating that the camera is in the test mode. At a next step S119, the film usage condition setting circuit 3 is controlled and caused to set the film usage condition of the film cartridge 1 to the unexposed condition (even if the film usage condition of the film cartridge 1 is in the partly exposed condition). The flow then comes to a step S125 to eject the film cartridge 1 and the series of actions then comes to an end.

If the mode data stored in the storage circuit 4 is found at the step S117 not to be the predetermined mode (in the case of a normal mode), the flow comes to a step S120 to check the MR bit. If the MR bit is found to be "0", it indicates that the film has been fully used for photographing to its end. In that case, the flow comes to a step S124. At the step S124, the film usage condition setting circuit 3 is caused to set the film usage condition of the film cartridge 1 to the exposed condition. The flow then comes to the step S125 to eject the film cartridge 1 and the series of actions comes to an end.

If the MR bit is found at the step S120 to be "1", it indicates a case where the film has been rewound halfway. In that case, the flow comes to a step S121. At the step S121, a check is made to find whether or not one or more frame portions of the film have been used for photographing. If the film is found to have been rewound without photographing even for a single frame portion, the flow comes to the step S119 to cause the film usage condition setting circuit 3 to set the film usage condition of the film cartridge 1 to the unexposed condition. In a case where the film is found at the step S121 to have been used for photographing at least one frame portion before rewinding it halfway, the flow comes to a step S123 to cause the film usage condition setting circuit 3 to set the film usage condition of the film cartridge 1 to the partly exposed condition. After that, the film cartridge is ejected at the step S125 and the series of actions comes to an end.

According to the arrangement of the first embodiment described above, when the camera is in a predetermined mode, the film usage condition is always set to the unexposed condition after rewinding the film. Therefore, in conducting various tests by actually loading the camera with a film cartridge, for example, at a factory (or at a service facility for the repair of a trouble after delivery to a user), the tests can be carried out without preparing a great number of film cartridges in the unexposed condition or without resetting the exposed condition or the partly exposed condition of a film cartridge back to the unexposed condition by using a dedicated tool. The first embodiment, therefore, obviates the necessity of spending an excessively long work time or preparing a dedicated jig solely for the purpose of setting the film usage condition of the film cartridge.

Further, in the case of the first embodiment, the check for the mode is made by using the data set in the storage circuit 4. However, the mode setting is not limited to this arrangement. Modes may be set beforehand by means of data inputted from the communication tool 5 prior to subjecting the camera to the tests of varied kinds. It is also possible to set modes beforehand by operating the switches (A and B) 15 and 16 in combination with each other. Further, the same advantageous effect is also attainable with a mode temporarily set by pushing the switch A or B in executing the step S116 of the flow chart of FIG. 2.

Second Embodiment

Figure 3:
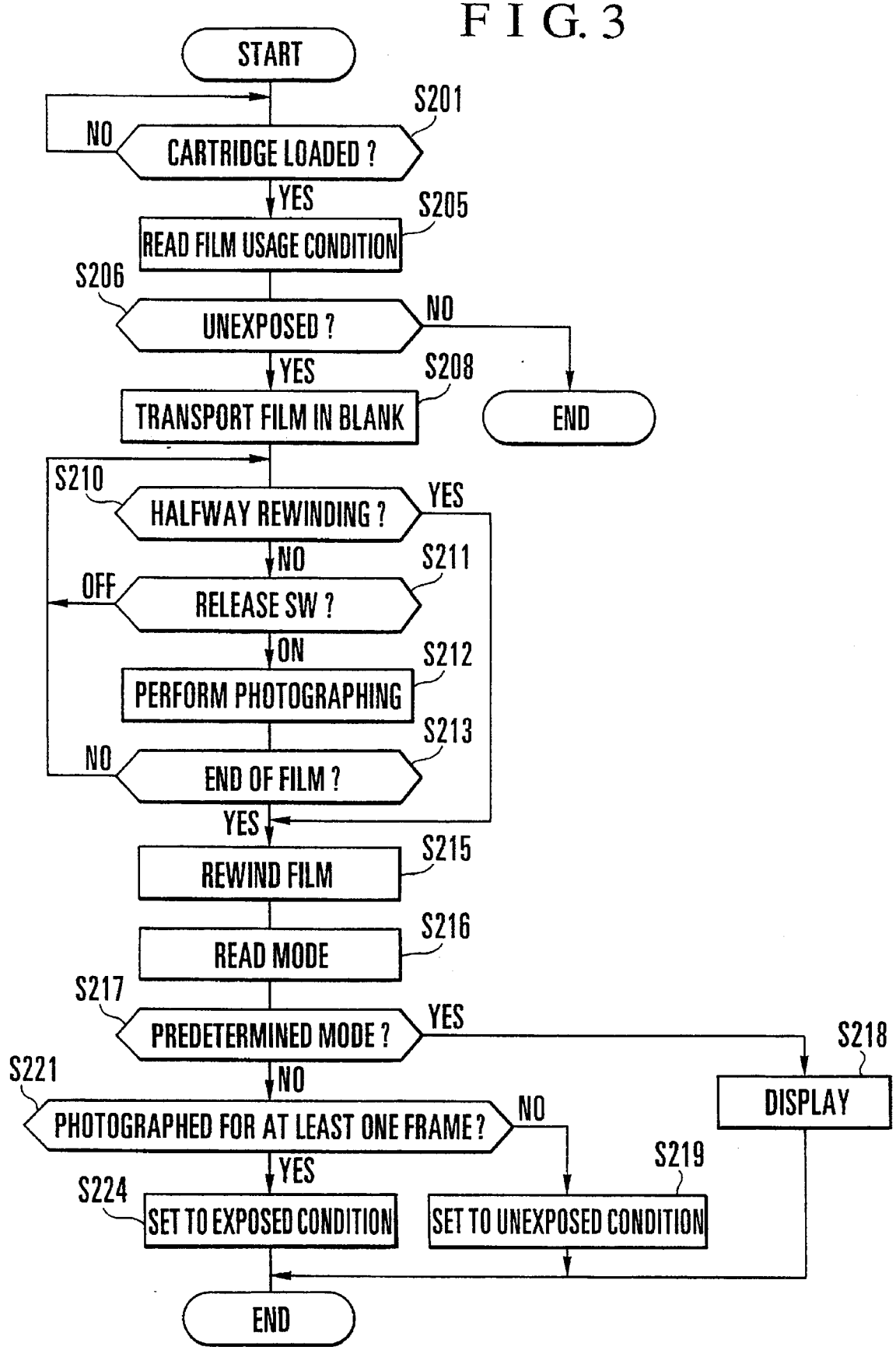
FIG. 3 is a flow chart showing an operation of a camera arranged as a second embodiment of the invention.

FIG. 3 is a flow chart showing actions of essential parts of a camera which is arranged as a second embodiment of the invention. The circuit arrangement of the second embodiment is similar to what is shown in FIG. 1 and described in the foregoing and is, therefore, omitted from the following description. The second embodiment normally allows a film cartridge to be used only when the film cartridge is in the unexposed condition. In other words, although any film cartridge can be loaded on the camera, actions subsequent to the blank film transporting action are allowed only when the camera is loaded with a film cartridge which is in the unexposed condition.

In FIG. 3, the actions of all steps numbered in the same manner as in FIG. 2 at the unit digit and tenth digit in each of three place numbers assigned to steps are similar to those of FIG. 2. Therefore, duplicating parts are omitted from the following description.

The flow chart of FIG. 3 differs from that of FIG. 2 in the following points. At a step S206, the blank film transporting and photographing actions are allowed to be performed only when the film cartridge 1 is in the unexposed condition, and are inhibited when the film cartridge 1 is in the partly exposed condition, in the exposed condition or in the developed condition.

At a step S221, if at least one frame portion of the film is found to have been used for photographing, the flow comes to a step S224 to set the film usage condition of the film cartridge 1 to the exposed condition even if some frame portions of the film remain unexposed, irrespective as to whether or not the film has been rewound halfway. The step S224 is provided since the camera is arranged to permit use of a film cartridge only in the unexposed condition and, therefore, an action of setting the film usage condition to the partly exposed condition is meaningless.

Another point of difference lies in that, in the predetermined mode (the test mode), the film usage condition is never set by the film usage condition setting circuit 3. In other words, when the read-out mode is found to be the predetermined mode at a step S217, the flow of operation comes to a step S218 to simply provide a display indicating that the camera is in the predetermined mode, without causing the film usage condition setting circuit 3 to do any setting action. This is because the film usage condition has not been changed and still remains in the unexposed condition. Since the film is in the state of having been rewound at a step S215, the film can be used as it is for the test action on a next unit of the camera manufactured.

The ejecting action on the film cartridge 1 at the steps S107 and S125 of FIG. 2 is totally irrelevant to the advantageous effect of the second embodiment. These steps are, therefore, omitted from FIG. 3.

The arrangement of the second embodiment also enables, like in the case of the first embodiment, tests of varied kinds to be carried out by actually loading the camera with a film cartridge, for example, at a factory (or at a service facility for repair after delivery to a user), without preparing a great number of film cartridges in the unexposed condition or without resetting the exposed condition or the partly exposed condition of a film cartridge back to the unexposed condition by using a dedicated tool arranged solely for that purpose. The second embodiment thus obviates the necessity of spending an excessively long work time or preparing a dedicated jig solely for the purpose of setting the film usage condition.

Third Embodiment

Figure 4:
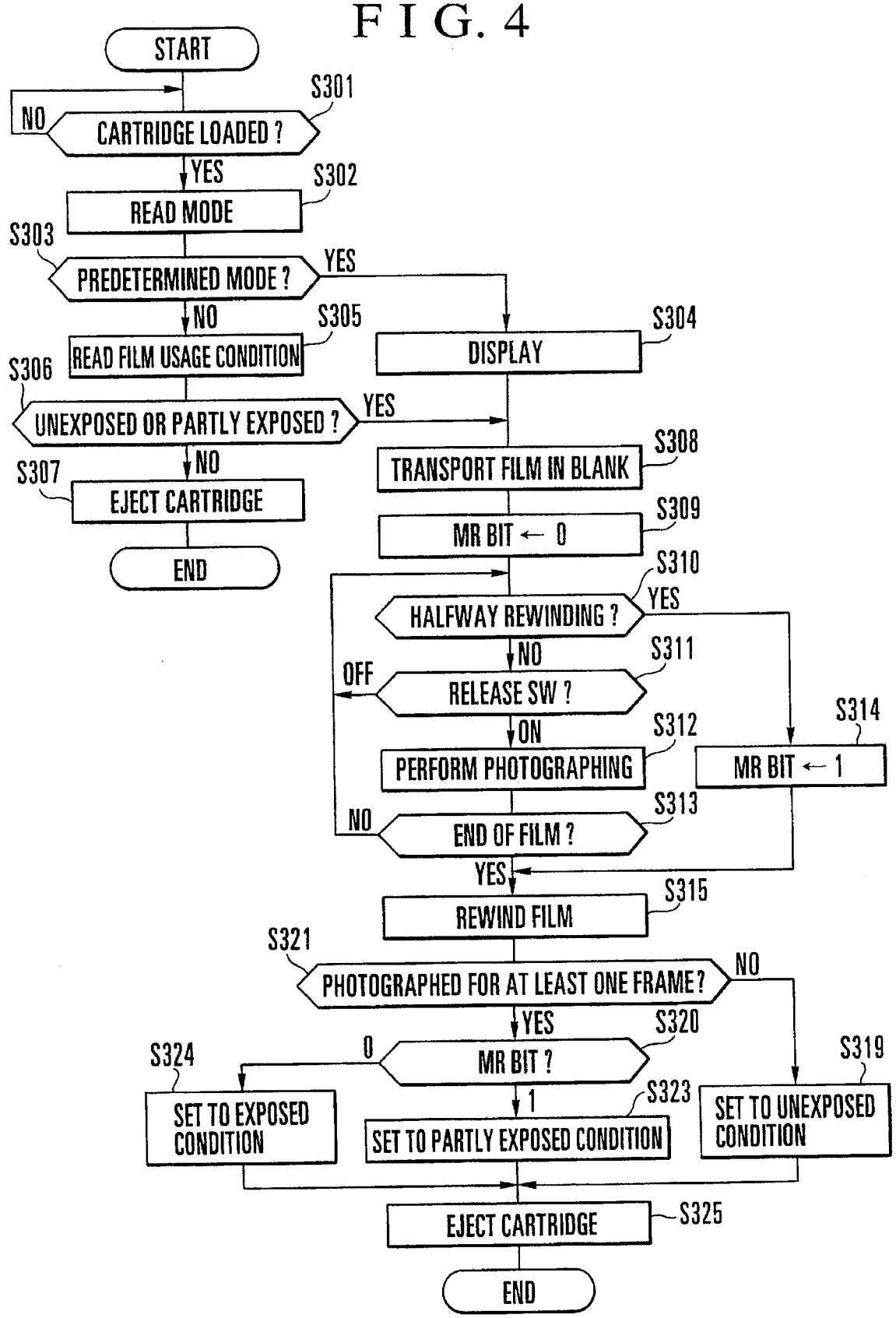
FIG. 4 is a flow chart showing an operation of a camera arranged as a third embodiment of the invention.

FIG. 4 is a flow chart showing actions of essential parts of a camera which is arranged as a third embodiment of the invention. The circuit arrangement of the camera is also similar to what is shown in FIG. 1 and described in the foregoing and is, therefore, omitted from the following description.

In the case of the third embodiment, the camera is arranged to normally use the film cartridge only when the film cartridge is either in the unexposed condition or in the partly exposed condition. In the case of a predetermined mode (or a test mode), the camera permits use of the film cartridge in any of the film usage conditions including the unexposed condition, the partly exposed condition, the exposed condition and the developed condition.

Therefore, the flow chart of FIG. 4 differs from that of FIG. 2 in the following point. In the case of FIG. 2, in taking out the film cartridge after the film is rewound when the camera is in the predetermined mode, the film usage condition of the film cartridge 1 is set to the unexposed condition. In the third embodiment as shown in FIG. 4, on the other hand, when the camera is in the predetermined mode, the blank film transporting action and photographing actions are allowed to be performed even when the film usage condition of the film cartridge 1 is not the unexposed condition nor the partly exposed condition.

Referring to FIG. 4, when the camera is found at a step S301 to have been loaded with the film cartridge capable of setting various film usage conditions, the flow comes to a step S302. At the step S302, the mode of the camera is read out. At a step S303, a check is made to find if the read-out mode is a predetermined mode which is, for example, a test mode of conducting various tests by loading the camera actually with the film. If so, the flow comes to a step S304 to provide a display indicating that the camera is in the predetermined mode, without coming to steps S305, S306 and S307 at which a film usage condition reading process and processes consequent thereon are to be executed. After providing the display, the flow comes to a step S308 to have the blank film transporting action carried out. After the step S308, photographing actions are performed in the same manner as in the case of FIG. 2.

Upon completion of photographing, the flow comes to a step S315 to rewind the film. At steps from S319 through S324, the film usage conditions are set as applicable and, after that, the film cartridge 1 is ejected at a step S325 to bring the flow of operation to an end.

The arrangement of the third embodiment enables the camera to perform the blank-film-transporting and photographing actions, i.e., test actions of varied kinds, irrespective of the film usage condition of the film cartridge when the camera is in the predetermined mode. Therefore, like in the cases of the first and second embodiments described, tests of varied kinds can be carried out by actually loading the camera with a film cartridge, for example, at a factory (or at a service facility for repair after delivery to a user) without preparing a great number of film cartridges in the unexposed condition or without resetting the exposed condition or the like of a film cartridge back to the unexposed condition by using a dedicated tool arranged solely for that purpose. The third embodiment thus obviates the necessity of spending an excessively long work time or preparing a dedicated jig solely for the purpose of setting the film usage condition.

Fourth Embodiment

Figure 5:
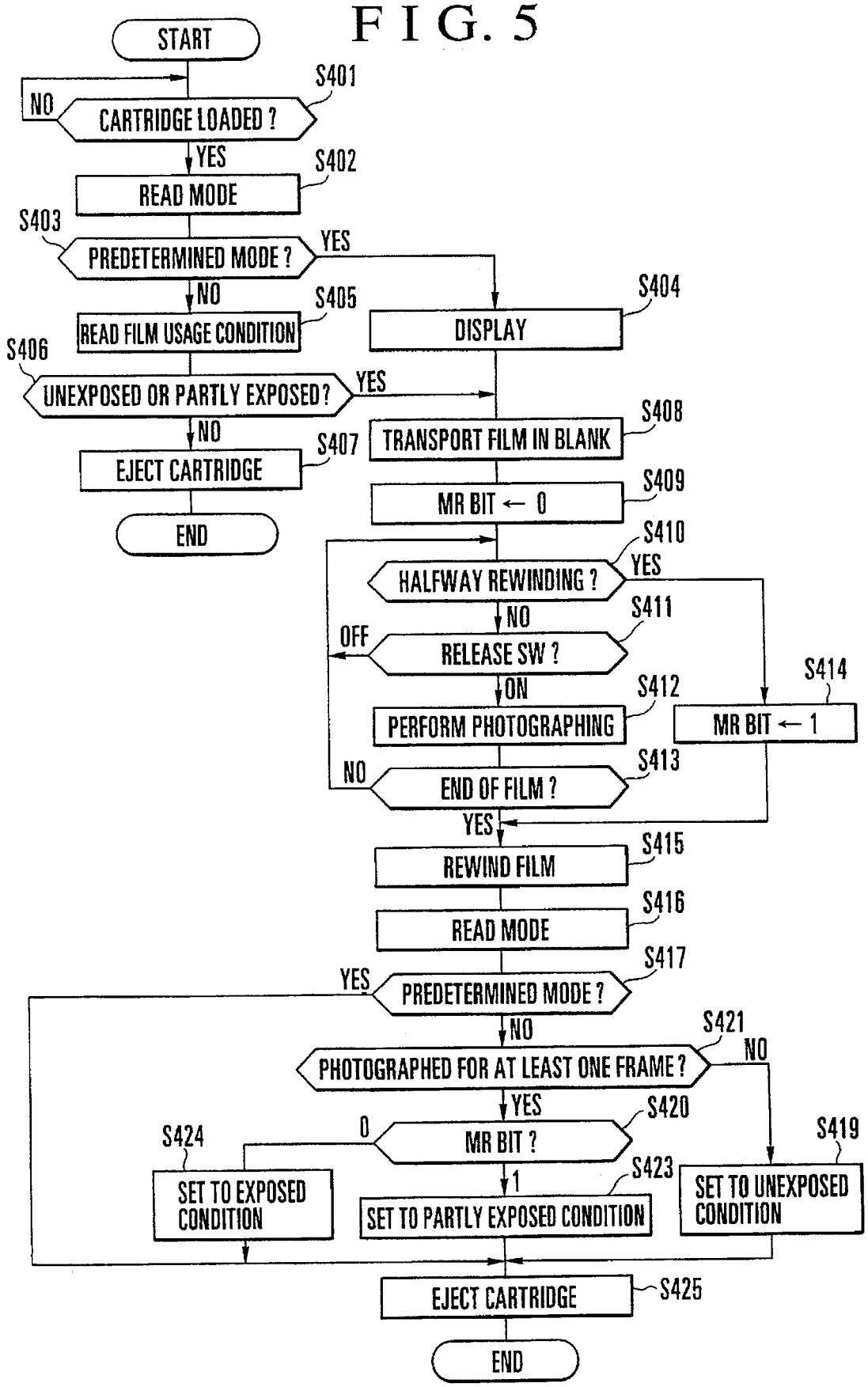
FIG. 5 is a flow chart showing an operation of a camera arranged as a fourth embodiment of the invention.

FIG. 5 is a flow chart showing actions of essential parts of a camera which is arranged as a fourth embodiment of the invention. The circuit arrangement of the camera is also similar to what is shown in FIG. 1 and described in the foregoing and is, therefore, omitted from the following description of the fourth embodiment.

In the case of the fourth embodiment, the camera is arranged to normally use the film cartridge only when the film cartridge is either in the unexposed condition or in the partly exposed condition. In the case of a predetermined mode (or a test mode), however, the camera permits use of the film cartridge in any of the film usage conditions including the unexposed condition, the partly exposed condition, the exposed condition and the developed condition. In addition to that, the camera is arranged such that, in a case where the camera is found to be in the predetermined mode when a check for a mode is made again after completion of film rewinding, the flow of operation is brought to an end without setting any film usage condition irrespective of the current film usage condition of the film cartridge.

Referring to FIG. 5, at steps S403, S404, S408 to S414, when the mode of the camera is found to be the predetermined mode, the blank film transporting action and photographing actions are allowed to be carried out irrespective of the film usage condition, like in the case of the third embodiment described in the foregoing. At a step S415, the film is rewound. After that, the mode of the camera is read out at a step S416. At a step S417, a check is made again to find if the mode is the predetermined mode. If so, the flow comes to a step S425 to immediately eject the film cartridge 1.

The arrangement of the fourth embodiment enables the camera to perform the blank-film-transporting and photographing actions, i.e., test actions of varied kinds, irrespective of the film usage condition of the film cartridge when the camera is in the predetermined mode. Therefore, like in the cases of each of the embodiments described, tests of varied kinds can be carried out by actually loading the camera with a film cartridge, for example, at a factory (or at a service facility for repair after delivery to a user) without preparing a great number of film cartridges in the unexposed condition or without resetting the exposed condition or the like of a film cartridge back to the unexposed condition by using a dedicated tool arranged solely for that purpose. The fourth embodiment thus obviates the necessity of spending an excessively long work time or preparing a dedicated jig solely for the purpose of setting the film usage condition.

The fourth embodiment is arranged, as mentioned above, to make a check for the mode again after the film rewinding and to terminate its action by ejecting the film cartridge without setting any film usage condition at all when the mode is found to be the predetermined mode. Therefore, as compared with the third embodiment, the length of time required for various tests becomes shorter. This arrangement thus has a great advantage in respect of cost reduction for a factory or the like where thousands of units of the camera are being manufactured per day.

Fifth Embodiment

Figure 6:
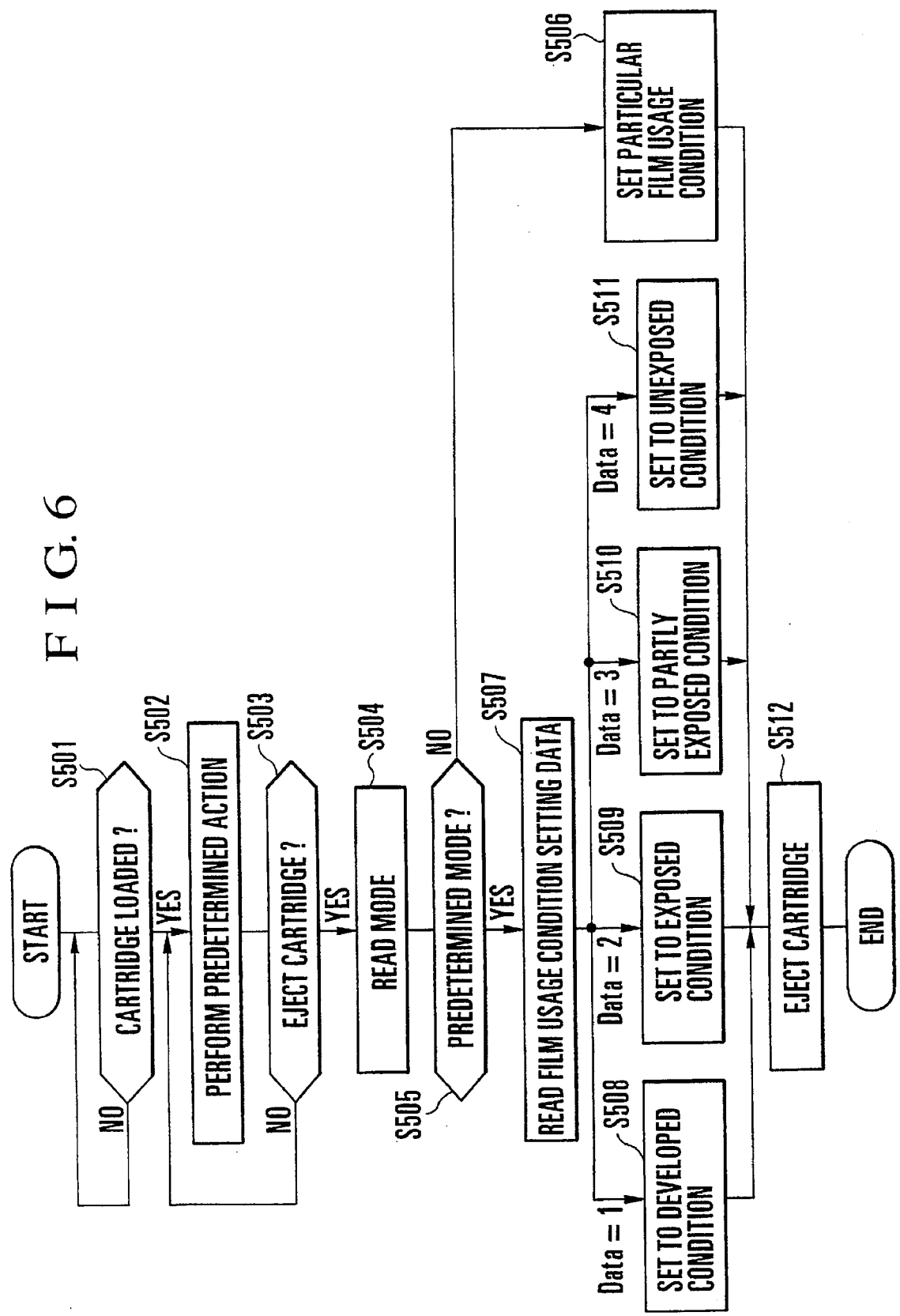
FIG. 6 is a flow chart showing an operation of a camera arranged as a fifth embodiment of the invention.

FIG. 6 is a flow chart showing actions of essential parts of a camera which is arranged as a fifth embodiment of the invention. The circuit arrangement of the camera is similar to what is shown in FIG. 1 and described in the foregoing and is, therefore, omitted from the following description of the fifth embodiment.

In the case of the fifth embodiment, the camera is arranged as follows. In a predetermined mode (a test mode), the film usage condition is set to a condition stored beforehand in the storage circuit 4. A check is made for the film usage condition as set. In a case where the camera is, for example, of the kind allowing use of a film cartridge in the unexposed condition and the partly exposed condition, a check can be made to ensure that any film cartridge that is set, for example, in the exposed condition is ejected when the camera is loaded with such a film cartridge.

Referring to FIG. 6, a check is made at a step S501 to find if the camera is loaded with the film cartridge 1. If so, the flow of operation comes to a step S502 to execute the actions of the steps from S105 through S115 as shown in FIG. 2.

At a step S503, a check is made to find if it is necessary to eject the film cartridge 1. If so, the flow comes to a step S504 to read out the mode data stored in the storage circuit 4. At a step S505, a check is made to find if the read-out data indicates a predetermined mode. If not, the flow comes to a step S506. At the step S506, the film usage condition setting action of the step S120, S123, S124, or the like is carried out as shown in FIG. 2.

If the mode data is found at the step S505 to indicate the predetermined mode, the flow comes to a step S507. At the step S507, data stored in the storage circuit 4 is read out to find for which of the film usage conditions the data is stored (for example one of Data 1 to Data 4). If the data is Data 1 which is for setting the developed condition, the flow comes to a step S508. At the step S508, the film usage condition setting circuit 3 is caused to set the film usage condition to the developed condition. If the data is Data 2 which is for setting the exposed condition, the flow comes to a step S509 to have the film usage condition set to the exposed condition. If the data is Data 3 which is for setting the partly exposed condition, the flow comes to a step S510 to have the film usage condition set to the partly exposed condition. If the data is Data 4 which is for setting the unexposed condition, the flow comes to a step S511 to have the film usage condition set to the unexposed condition.

At a step S512, the film cartridge 1 is ejected to bring the series of actions to an end.

The fifth embodiment is arranged, as mentioned above, to set the film cartridge to a film usage condition which is set beforehand, when the camera is in the predetermined mode. Therefore, tests of varied kinds can be carried out by actually loading the camera with a film cartridge, for example, at a factory (or at a service facility for repair after delivery to a user) without preparing a great number of film cartridges in the unexposed condition or without resetting the exposed condition or the partly exposed condition of a film cartridge back to the unexposed condition by using a dedicated tool arranged solely for that purpose. The fifth embodiment thus obviates the necessity of spending an excessively long work time or preparing a dedicated jig solely for the purpose of setting the film usage condition.

Further, the above-stated arrangement of setting the film usage condition to a predetermined condition in the event of the predetermined mode permits making a check for the operating state of the film usage condition setting circuit 3 by looking at the film usage condition indicating part provided on the film cartridge ejected.

Further, when the camera is loaded with a film cartridge which is set in the unexposed condition or the partly exposed condition, with the camera being arranged to permit use of a film cartridge in the unexposed condition or in the partly exposed condition, the predetermined actions are allowed to be carried out at the step S502. After that, an operation check can be made to decide whether or not a series of actions is to be terminated through the steps S504, S505, S506 and S512. In a case where the camera is loaded with a film cartridge which is set in the exposed condition or in the developed condition, on the other hand, a check can be made to find whether the film cartridge can be ejected or not without performing the blank film transporting action at the step S502.

While the fifth embodiment is arranged also to read the mode of the camera and the film usage condition through the data set in the storage circuit 4, the invention is not limited to such an arrangement. The same advantageous effect can be attained by changing this arrangement to set a mode and to store a film usage condition in an internal memory of the control circuit 9 beforehand by using data inputted from the communication tool 5, or to set a mode by operating the switches A and B in combination and to designate a film usage condition by operating the switches shown in FIG. 1 in combination.

Sixth Embodiment

Figure 7:
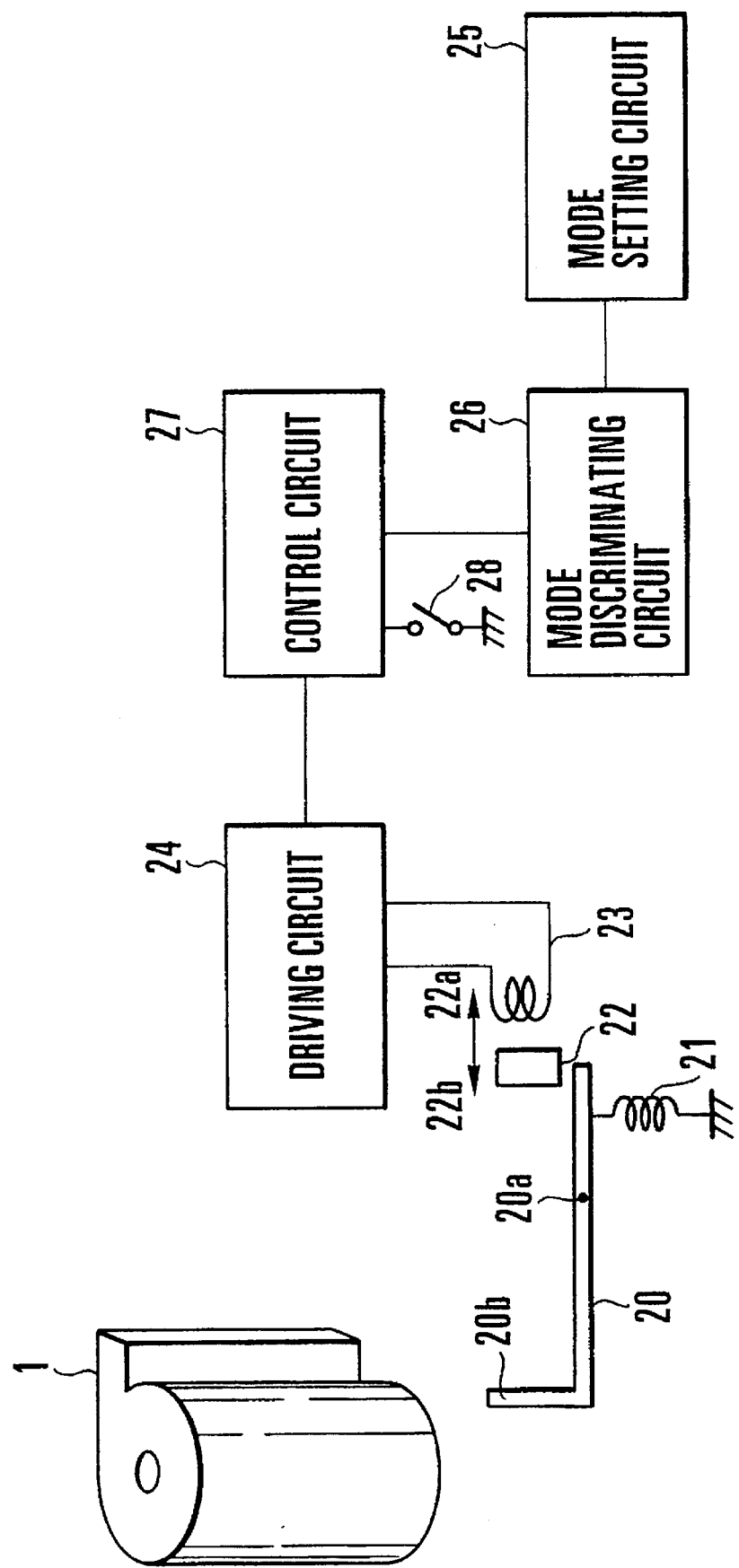
FIG. 7 is a block diagram showing the arrangement of essential parts of a camera arranged according to the invention as a sixth embodiment thereof.

FIG. 7 is a block diagram showing the arrangement of essential parts of a camera which is arranged as a sixth embodiment of the invention.

Referring to FIG. 7, a film cartridge 1 is capable of setting the unexposed condition and some other conditions. The camera is provided with a film blocking member 20 which is arranged to prevent the camera from being duly loaded with the film when the film cartridge 1 in a condition other than the unexposed condition is inserted into the camera. A spring 21 is arranged to pull the film blocking member 20 downward as viewed on the drawing. The film blocking member 20 and the spring 21 jointly form a blocking circuit. An inhibiting member 22 is arranged to inhibit the film blocking member 20 from swinging on a center of swing 20a when the film cartridge 1 is inserted if the film cartridge is in a condition other than the unexposed condition. A plunger 23 is arranged to retract the inhibiting member 22. A driving circuit 24 is arranged to drive the plunger 23.

A mode setting circuit 25 is arranged to set a test mode, an ordinary photographing mode, etc. A mode discriminating circuit 26 is arranged to discriminate, from other modes, a mode of inhibiting the blocking circuit from acting according to data coming from the mode setting circuit 25. A control circuit 27 is arranged to control and cause the driving circuit 24 to inhibit the action of the blocking circuit on the basis of data coming from the mode discriminating circuit 26. A switch 28 is arranged to turn on when the film cartridge 1 is inserted.

Figure 8:
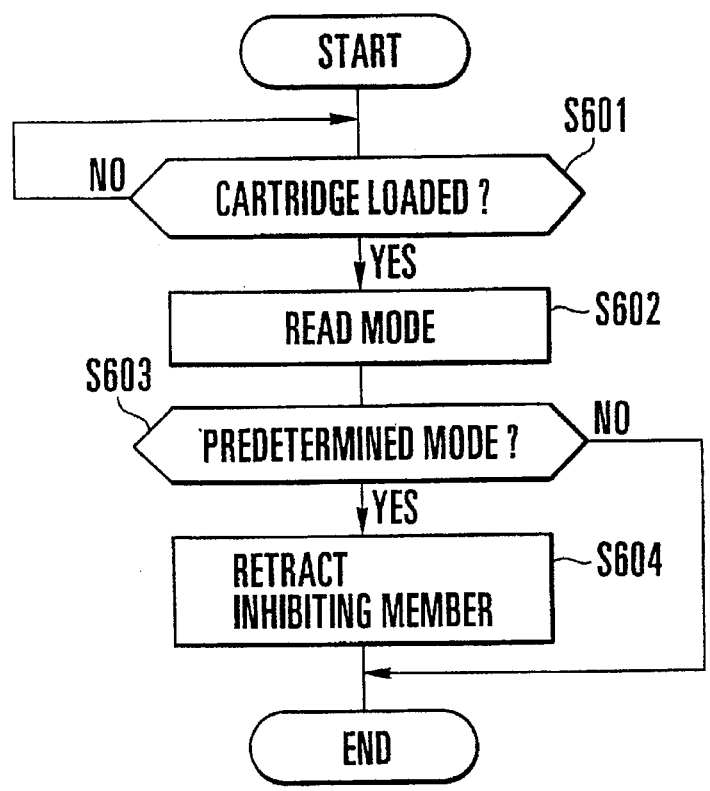
FIG. 8 is a flow chart showing an operation of an essential part of the camera of the sixth embodiment.

Actions of essential parts of the camera which is arranged as described above are next described below with reference to FIG. 8 which is a flow chart.

At a step S601, the film cartridge 1 is judged to be inserted when the switch 28 turns on. At a step S602, mode data is read from the mode setting circuit 25. At a step S603, a check is made through the mode discriminating circuit 26 to find if the data indicates a predetermined mode. If so, the flow of operation comes to a step S604. At the step S604, the control circuit 27 causes the plunger 23 to be energized through the driving circuit 24. The plunger 23 then causes the inhibiting member 22 to move from a position 22b to another position 22a. The motion of the inhibiting member 22 then renders the blocking member 20 swingable against the force of the spring 21 accordingly as the blocking member 20 is pushed by the film cartridge 1. As a result, the camera can be loaded with the film of the film cartridge even when the film cartridge 1 is in a condition other than the unexposed condition.

After that, the blank film transporting action and photographing actions are performed in a normal manner.

According to the above-stated arrangement of the sixth embodiment, the film cartridge is inhibited from being duly loaded in a normal position by a bent-up part 20b of the blocking member 20 when the film cartridge is in a condition other than the unexposed condition. When the camera arranged in this manner is set in a predetermined mode, the blocking member 20 is retracted to a position where the film cartridge can be duly loaded irrespective of the film usage condition set on the film cartridge. Therefore, like in the case of each of the embodiments described above, tests of varied kinds can be carried out by actually loading the camera with a film cartridge, for example, at a factory (or at a service facility for repair after delivery to a user) without preparing a great number of film cartridges in the unexposed condition or without resetting the exposed condition or the partly exposed condition of a film cartridge back to the unexposed condition by using a dedicated tool arranged solely for that purpose. The sixth embodiment thus obviates the necessity of spending an excessively long work time or preparing a dedicated jig solely for the purpose of setting the film usage condition.

Figure 9:
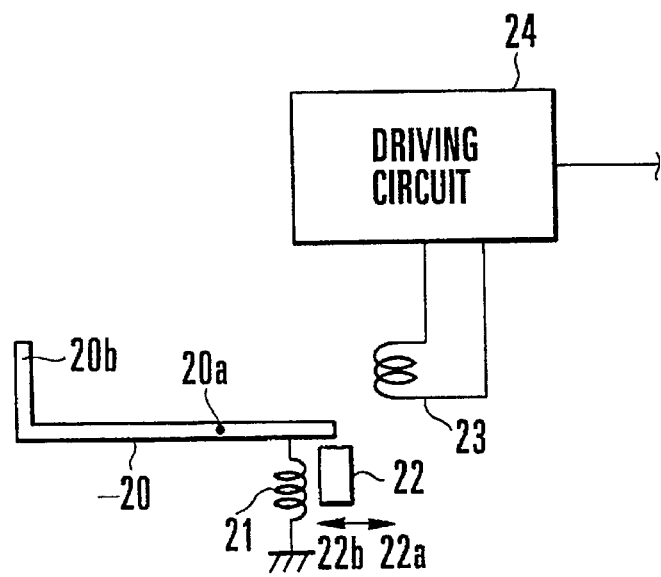
FIG. 9 shows another example of a blocking member which is shown in FIG. 7.

Further, in accordance with the invention, the arrangement for retracting the inhibiting member is not limited to the action of the step S604. For example, the camera may be arranged as shown in FIG. 9 to cause the blocking member 20 itself to be retracted. It is also possible to attain the same advantageous effect by arranging the shape of the bent-up part 20b of the blocking member 20 to be variable or by arranging some other circuit to render the blocking circuit inoperative.

Seventh Embodiment

Figure 10:
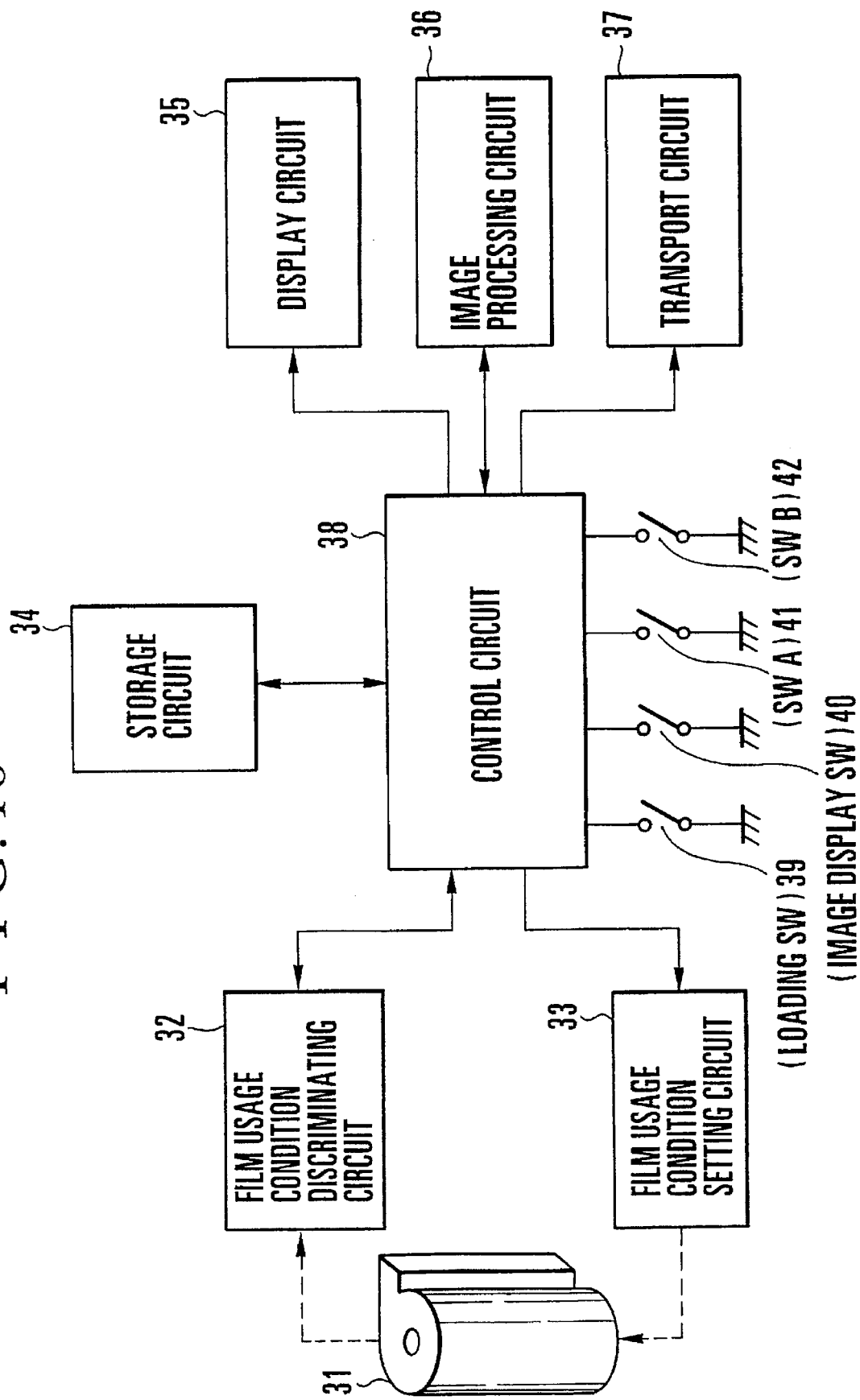
FIG. 10 is a block diagram showing the arrangement of essential parts of an image viewing apparatus arranged according to the invention as a seventh embodiment thereof.

FIG. 10 is a block diagram showing the arrangement of essential parts of an image viewing apparatus arranged as a seventh embodiment of the invention to use a film cartridge capable of setting various film usage conditions.

Referring to FIG. 10, a film cartridge 31 is capable of setting at least two of various film usage conditions including the unexposed condition, the exposed condition, the partly exposed condition and the developed condition. A film usage condition discriminating circuit 32 is arranged to discriminate each of the film usage conditions of the film cartridge 31 from others. A film usage condition setting circuit 33 is arranged to set the film usage condition of the film cartridge 31. A storage circuit 34 is a nonvolatile memory such as an EEPROM or the like and arranged to store various adjustment data, test mode data, etc.

A display circuit 35 is arranged to display image information as inputted. An image processing circuit 36 is arranged to read images from a developed film and to convert the images into image display information in a known manner. A transport circuit 37 is arranged to perform a blank film transporting action, a one-frame winding action and a rewinding action on the film. A control circuit 38 is arranged to control the above-stated circuits, from the film usage condition discriminating circuit 32 through the transport circuit 37.

A cartridge loading switch 39 is arranged to be turned on when the film cartridge 31 is loaded. A switch A 41 and a switch B 42 are arranged to be normally used for setting information of varied kinds and also to be used for setting a test mode by operating them in combination with each other or with some other operation switches. The switches A and B thus form mode setting means which represents a feature of the invention.

Actions of the essential parts of the image viewing apparatus which is arranged as described above are next described with reference to FIG. 11 which is a flow chart. In the case of this embodiment, the image viewing apparatus is arranged to normally permits the user to use only a film cartridge in the developed condition.

Figure 11:
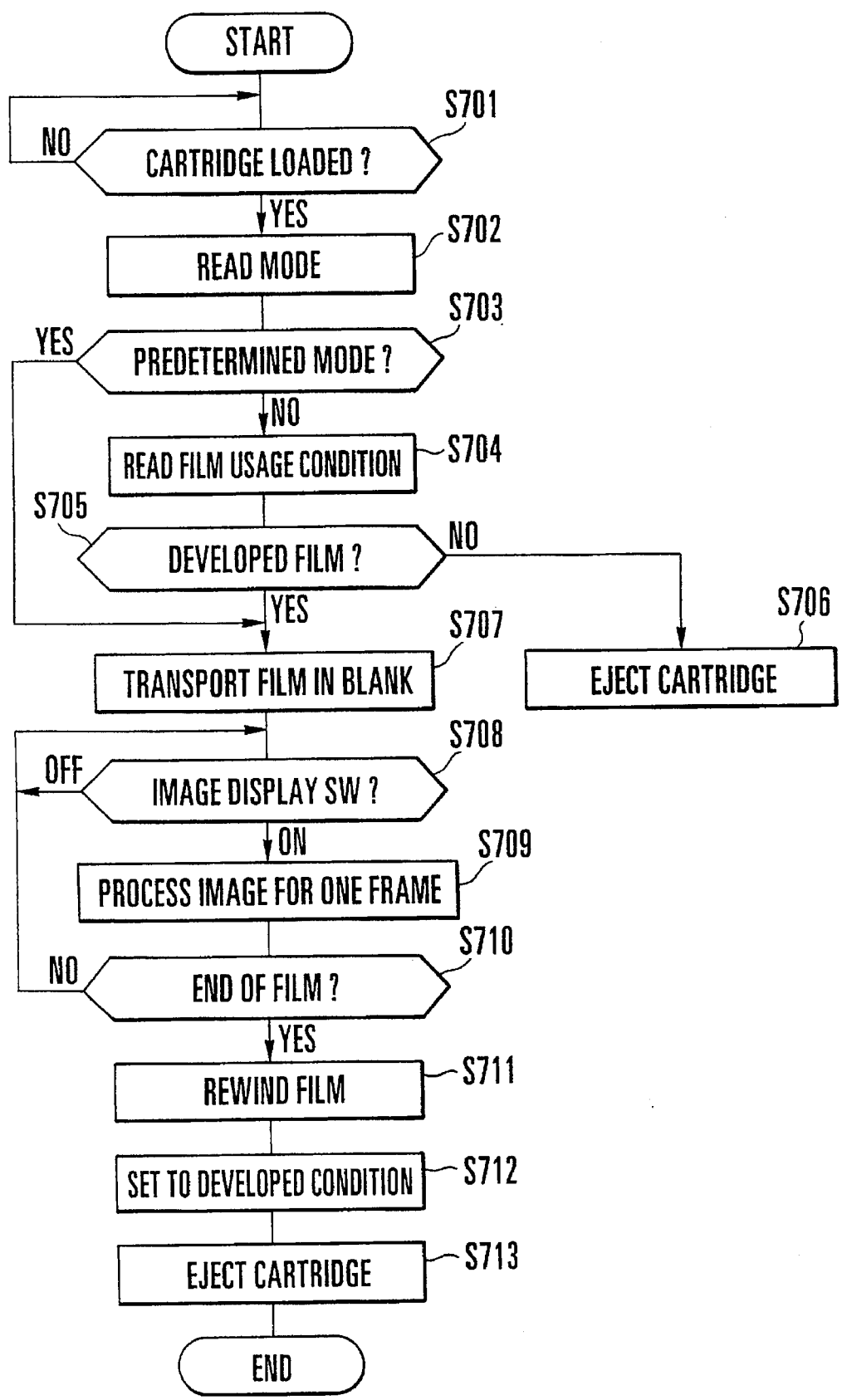
FIG. 11 is flow chart showing an operation of the image viewing apparatus according to the seventh embodiment of the invention.

Referring to FIG. 11, at a step S701, when the cartridge loading switch 39 is found to have turned on, the apparatus is considered to have been loaded with the film cartridge 31 capable of setting the various film usage conditions. At a step S702, the control circuit 38 reads mode data stored in the storage circuit 34. At a step S703, a check is made to find if the mode data indicates a predetermined mode (or a test mode) requiring a test of film transport, etc., by loading the apparatus actually with the film. If not, the flow of operation comes to a step S704. At the step S704, the film usage condition discriminating circuit 32 is instructed to read the film usage condition of the film cartridge 31. At a step S705, a check is made to find if the film usage condition is the developed condition. If not, the flow comes to a step S706 to eject the film cartridge 31 and the series of actions comes to an end.

In cases where the mode data is found at the step S703 to indicate the predetermined mode or where the film usage condition is found at the step S705 to be the developed condition, the flow comes to a step S707. At the step S707, the control circuit 38 causes the transport circuit 37 to perform the blank film transporting action.

At a step S708, a check is made to find if the image display switch 40 is pushed. If so, the flow comes to a step S709. At the step S709, the image processing circuit 36 is driven to read an image from the developed film by means of a CCD or the like and to convert the image into an image display signal. The image display signal is supplied to the display circuit 35 of a monitor or a TV screen or the like to provide a display for viewing.

After the step S709, the flow comes to a step S710 to make a check to find if the film has reached its end. If not, the flow comes back to the step S708 to repeat the same actions. If so, the flow comes to a step S711. At the step S711, the transport circuit 37 is caused to perform a film rewinding action. At a step S712, the film usage condition setting circuit 33 is caused to set the film usage condition of the film cartridge 31 to the developed condition. At a step S713, the film cartridge 31 is ejected and the series of actions comes to an end.

As described above, the seventh embodiment is arranged to permit, when the apparatus is in the predetermined mode, the blank film feeding action and image processing action irrespective of the film usage condition of the film cartridge. Therefore, tests of varied kinds can be carried out by actually loading the apparatus with a film cartridge, for example, at a factory (or at a service facility for repair after delivery to a user) without preparing a great number of film cartridges in the unexposed condition or without resetting the exposed condition or the partly exposed condition of a film cartridge back to the unexposed condition by using a dedicated tool arranged solely for that purpose. The sixth embodiment thus obviates the necessity of spending an excessively long work time or preparing a dedicated jig solely for the purpose of setting the film usage condition.

In the case of seventh embodiment, the invention is applied by way of example to an image viewing apparatus which corresponds to the camera of the third embodiment. However, image viewing apparatuses to which the invention is applicable is not limited to the apparatus of the seventh embodiment. The invention is applicable, as will be apparent to those skilled in the art, to any of image viewing apparatuses which correspond respectively to other embodiments including the first, second, fourth, fifth and sixth embodiments described in the foregoing.

What is claimed is:

1. A film cartridge using device for using a film cartridge having a usage condition setting part arranged to be set to a state of indicating a usage condition of a film, said film cartridge using device comprising:

a) a usage condition detecting circuit for detecting a setting condition of the usage condition setting part;

b) a processing circuit having a first mode of (i) performing a predetermined first processing action when the setting condition detected by said usage condition detecting circuit is a predetermined first usage condition and (ii) performing a second processing action different from the first processing action when the setting condition detected by said usage condition detecting circuit is a second usage condition different from the first usage condition and a second mode of performing the first processing action even when the setting condition of the usage condition setting part is the second usage condition; and c) a selection circuit for selecting one of the first and second modes.

2. A device according to claim 1, wherein said film cartridge using device is a camera, and wherein said first processing action includes at least a photographing action.

3. A device according to claim 1, wherein said film cartridge using device is a camera, and wherein said first processing action includes at least a film transporting action.

4. A device according to claim 2, wherein said film cartridge using device is a camera, and wherein said second processing action includes at least a photography inhibiting action.

5. A device according to claim 3, wherein said film cartridge using device is a camera, and wherein said second processing action includes at least a photography inhibiting action.

6. A device according to claim 2, wherein said first usage condition is an unexposed condition or a partly exposed condition.

7. A device according to claim 6, wherein said second usage condition is an all-frame exposed condition.

8. A camera for using a film cartridge having a usage condition setting part arranged to be set to a state of indicating a usage condition of a film, said camera comprising:

a) a usage condition detecting circuit for detecting a setting condition of the usage condition setting part;

b) a processing circuit having a first mode of (i) allowing at least a part of a sequence of photographing actions to be performed and setting the usage condition setting part to a state of indicating a usage condition of the film corresponding to a status of performing the sequence of photographing actions when the setting condition detected by said usage condition detecting circuit is a predetermined first usage condition and (ii) inhibiting the part of the sequence of photographing actions from being performed when the setting condition detected by said usage condition detecting circuit is a second usage condition different from the first usage condition and a second mode of allowing the part of the sequence of photographing actions to be performed even when the setting condition of the usage condition setting part is the second usage condition; and c) a selection circuit for selecting one of the first and second modes.

9. A film cartridge using device for using a film cartridge having a usage condition setting part arranged to be set to a state of indicating a usage condition of a film, said film cartridge using device comprising:

a) a usage condition detecting circuit for detecting a setting condition of the usage condition setting part;

b) a processing circuit having a first mode of (i) performing a predetermined first processing action when the setting condition detected by said usage condition detecting circuit is a predetermined first usage condition and (ii) performing a second processing action different from the first processing action when the setting condition detected by said usage condition detecting circuit is a second usage condition different from the first usage condition and a second mode of inhibiting the second processing action even when the setting condition of the usage condition setting part is the second usage condition; and c) a selection circuit for selecting one of the first and second modes.

10. A film cartridge using device, or a camera, for using a film cartridge having a usage condition setting part arranged to be set to a state of indicating a usage condition of a film, said film cartridge using device or said camera comprising:

a) a usage condition detecting circuit for detecting a setting condition of the usage condition setting part;

b) a processing circuit having a first mode of (i) allowing at least a part of a sequence of photographing actions to be performed and setting the usage condition setting part to a state of indicating a usage condition of the film corresponding to a status of performing the sequence of photographing actions when the setting condition detected by said usage condition detecting circuit is a predetermined first usage condition and (ii) inhibiting the part of the sequence of photographing actions from being performed when the setting condition detected by said usage condition detecting circuit is a second usage condition different from the first usage condition and a second mode of performing the sequence of photographing actions and setting the usage condition setting part to a state of indicating the first usage condition; and c) a selection circuit for selecting one of the first and second modes.

11. A film cartridge using device, or a camera, for using a film cartridge having a usage condition setting part arranged to be set to a state of indicating a usage condition of a film, said film cartridge using device or said camera comprising:

a) a usage condition detecting circuit for detecting a setting condition of the usage condition setting part;

b) a processing circuit having a first mode of (i) allowing at least a part of a sequence of photographing actions to be performed and setting the usage condition setting part to a state of indicating a usage condition of the film corresponding to a status of performing the sequence of photographing actions when the setting condition detected by said usage condition detecting circuit is a predetermined first usage condition and (ii) inhibiting the part of the sequence of photographing actions from being performed when the setting condition detected by said usage condition detecting circuit is a second usage condition different from the first usage condition and a second mode of performing the sequence of photographing actions and retaining the setting condition of the usage condition setting part; and c) a selection circuit for selecting one of the first and second modes.

12. A film cartridge using device, or a camera, for using a film cartridge having a usage condition setting part arranged to be set to a state of indicating a usage condition of a film, said film cartridge using device or said camera comprising:

a) a loading restricting part for allowing the film cartridge to be loaded on said film cartridge using device or said camera when the setting condition of the usage condition setting part is a first usage condition and for inhibiting the film cartridge from being loaded when the setting condition is a second usage condition; and b) a control circuit for inhibiting a loading inhibiting action of said loading restricting part.

13. A film cartridge using device, or a camera, for using a film cartridge having a usage condition setting part arranged to be set to a state of indicating a usage condition of a film, said film cartridge using device or said camera comprising:

a) a usage condition detecting circuit for detecting a setting condition of the usage condition setting part;

b) a data setting circuit for setting data indicative of a usage condition of the film;

c) a processing circuit having a first mode of allowing at least a part of a sequence of photographing actions to be performed and setting the usage condition setting part to a state of indicating a usage condition of the film corresponding to a status of performing the sequence of photographing actions when the setting condition detected by said usage condition detecting circuit is a predetermined first usage condition and a second mode of setting the usage condition setting part to the usage condition according to the data set by said data setting circuit; and d) a selection circuit for selecting one of the first and second modes.

14. A device according to claim 9, wherein said film cartridge using device is a camera, and wherein said first processing action includes at least a photographing action.

15. A device according to claim 9, wherein said film cartridge using device is a camera, and wherein said first processing action includes at least a film transporting action.

16. A device according to claim 14, wherein said film cartridge using device is a camera, and wherein said second processing action includes at least a photography inhibiting action.

17. A device according to claim 15, wherein said film cartridge using device is a camera, and wherein said second processing action includes at least a photography inhibiting action.

18. A device according to claim 14, wherein said first usage condition is an unexposed condition or a partly exposed condition.

19. A device according to claim 18, wherein said second usage condition is an all-frame exposed condition.

20. A device or a camera according to claim 10, wherein said first usage condition is an unexposed condition.

21. A device or a camera according to claim 20, wherein said second usage condition is an all-frame exposed condition.

22. A device or a camera according to claim 11, wherein said first usage condition is an unexposed condition.

23. A device or a camera according to claim 12, wherein said first usage condition is an unexposed condition.

* * * * *

UNITED STATES PATENT AND TRADEMARK OFFICE
CERTIFICATE OF CORRECTION

PATENT NO. : 5,655,168
DATED : August 5, 1997
INVENTOR(S) : Ohtsuka, Masanori

It is certified that error appears in the above-identified patent and that said Letters Patent are hereby corrected as shown below:

Col. 6, line 22, delete "cartridge i" and insert -- cartridge 1 --.

Signed and Sealed this

Second Day of June, 1998

Attest:

BRUCE LEHMAN

*Attesting Officer*        *Commissioner of Patents and Trademarks*